J. H. Gatiss,
Water Wheel,
Nº 13,895.                    Patented Dec. 4, 1855.
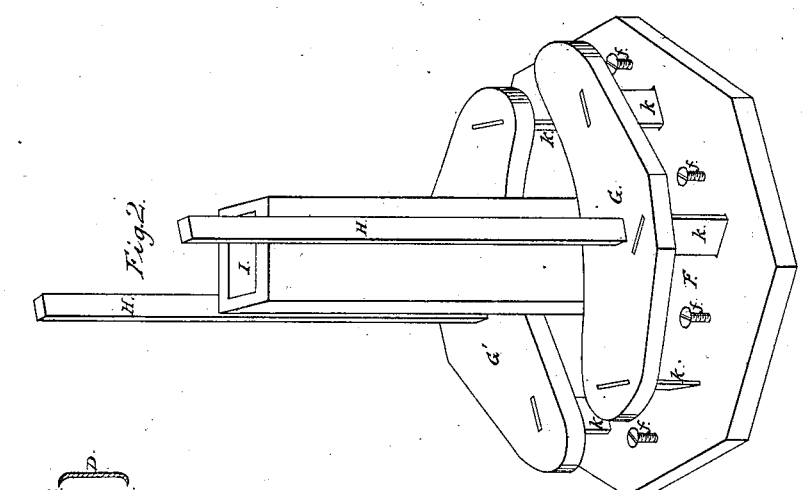
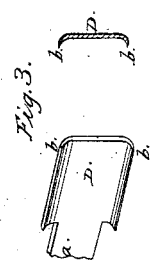
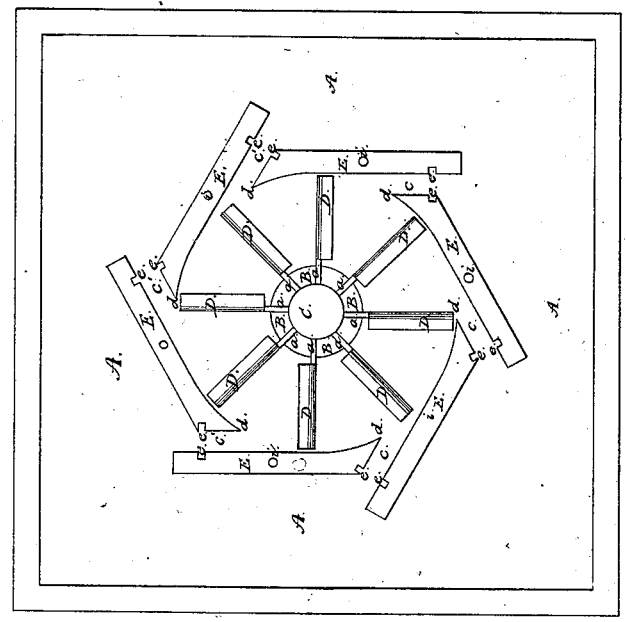

UNITED STATES PATENT OFFICE.

JOHN H. GATISS, OF FRANKLINDALE, ASSIGNOR TO ABRAHAM EDWARDS, OF TOWANDA, PENNSYLVANIA.

IMPROVEMENT IN WATER-WHEELS.

Specification forming part of Letters Patent No. 13,895, dated December 4, 1855.

*To all whom it may concern:*

Be it known that I, JOHN H. GATISS, of Franklindale, in the county of Bradford and State of Pennsylvania, have invented certain new and useful Improvements in Center-Vent Water-Wheels; and I do hereby declare the following to be a full, clear, and exact description of the same, reference being had to the accompanying drawings, making a part thereof, in which—

Figure 1 represents a view from the top of the flume, looking down upon the wheel, the deck which covers the wheel being removed to better show the water-inlets, &c. Fig. 2 represents the deck with the gates and hollow tube for the shaft of the wheel to pass through connected therewith, the whole being detached from the case of the wheel; and Fig. 3 represents a perspective view and transverse section through one of the buckets.

Similar letters where they occur in the several figures denote like parts in all.

The nature of my invention relates to center-vent water-wheels, upon which the water acts directly and not by reaction; and it consists in the arrangement of the buckets and inlet water-ways so that the water is let onto all the buckets simultaneously and with uniformity at or near their extreme outer points, and is allowed to escape at the center after having expended its force upon the buckets.

To enable others skilled in the art to make and use my invention, I will proceed to describe the same with reference to the drawings.

A represents a rectangular box or flume of a size to correspond with the size of the wheel or head of water used, having an opening B in the central part of the bottom for the expended water to escape from. Beneath the bottom part is a bridge tree or support for the lower end of the shaft C of the wheel.

$a\,a\,a$ are arms extending radially from the shaft C, and upon said arms are arranged the buckets D D D, which are slightly concave on the side which receives the water and convex on their back, the edges of said buckets tapering to a sharp edge, as seen at $b\,b$, Fig. 3.

Tangential with the circle described by the outer points of the buckets are placed the wings E E E, so as to leave water-ways or inlets $c\,c\,c'\,c'$ between each, the inner points of said wings slightly curving to meet the sweep of the points of the buckets, as seen at $d\,d\,d$. Gains or grooves $e\,e\,e\,e$ are cut on the wings E, in which the gates (to be hereinafter described) for letting on or shutting off the water may slide.

F, Fig. 2, is a deck which fits snugly over the wings E and the wheel within them, said deck being held down to said wings by the screws $f\,f\,f$, passing through the deck and into the holes $i\,i\,i$ in the wings or in any other manner that will serve the same purpose.

G G′ are two segmental pieces having upon them the gates or wickets $k\,k\,k$, so set that they will slide into the gains $e\,e$ and close or open the passages through which the water passes to the wheel. The gates on G close the passages $c\,c$ and those on G′ the passages $c'\,c'$, said gates passing through openings in the deck F. To each of the segmental pieces G G′ is attached a rod H, by which they are raised either by a lever, winch, or other equivalent device, and the two rods may be so united to one lifting apparatus as to be all lifted gradually and simultaneously, and thus allow the water to act upon all and every bucket at once. On the deck F is also arranged a hollow trunk or tube I, through which the shaft of the water-wheel passes to its upper bearing, the object being to exclude the wheel from the water entirely when not acting to prevent freezing in winter, but to have the whole weight of the water, as well as its momentum, when the wheel is running.

In Fig. 3 the shape of the buckets is shown. The lips or flanges $b\,b$ are for the purpose of holding the water to the face of the bucket and causing it to flow or escape to the center of the wheel, and by bringing these lips to an edge prevents the formation of an eddy or counter current at those points.

The water flows into the flume from the forebay, filling it to near its top, and is let onto the buckets at the very bottom of the flume and below the point where there would be any agitation or "breaking up" in the water, which is important, for it is well known that the effect of water is materially deteriorated when agitated or broken up, owing to its reacting properties—a thing which I have specially avoided. For the above reason a center vent to a reacting-wheel has failed to a great extent, and the direct action of water on a plain bucket is equally disadvantageous when it is let onto the wheel in an agitated or reacting state. My arrangement obviates these two objections to center-vent wheels, and has proved highly successful in practice.

Having thus fully described the nature of my invention, I would state that I am aware center-vent water-wheels have been used and that the shafts of such wheels, as well as the wheels themselves, have been inclosed in a flume. These, therefore, I do not claim; but

What I do claim as new, and desire to secure by Letters Patent, is—

The arrangement of the gates, passages, and buckets of a center-vent wheel such as described, so that the water may act upon each bucket simultaneously and with equal force, first striking them at their very lowest points and held thereto by the lips or flanges, and then escaping to the center discharge, as set forth and shown.

JOHN H. GATISS.

Witnesses:
A. B. STOUGHTON,
THOS. H. UPPERMAN.